(12) United States Patent
Yonezawa

(10) Patent No.: US 6,727,865 B1
(45) Date of Patent: Apr. 27, 2004

(54) HEAD MOUNTED DISPLAY

(75) Inventor: Hiroki Yonezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/722,546

(22) Filed: Nov. 28, 2000

(30) Foreign Application Priority Data

| Nov. 29, 1999 | (JP) | ............................................ 11-336978 |
| Nov. 10, 2000 | (JP) | ...................................... 2000-343797 |

(51) Int. Cl.⁷ ................................................ G09G 5/00
(52) U.S. Cl. .................................. 345/7; 345/8; 345/9
(58) Field of Search .......................... 345/7, 8, 9, 158, 345/169, 130; 359/629, 630, 53; 348/158

(56) References Cited

U.S. PATENT DOCUMENTS

| 5,414,544 A | * | 5/1995 | Aoyagi et al. .................. 345/8 |
| 5,844,530 A | * | 12/1998 | Tosaki ............................ 345/7 |
| 5,949,388 A | * | 9/1999 | Atsumi et al. .................. 345/8 |
| 5,954,642 A | * | 9/1999 | Johnson et al. ............. 600/300 |
| 5,991,085 A | * | 11/1999 | Rallison et al. ............. 359/630 |
| 6,124,976 A | * | 9/2000 | Miyazaki ........................ 345/7 |
| 6,215,460 B1 | * | 4/2001 | Mizoguchi et al. ............. 345/8 |
| 6,239,771 B1 | * | 5/2001 | Usuki et al. .................... 345/8 |
| 6,346,929 B1 | * | 2/2002 | Fukushima et al. ............. 345/8 |
| 6,359,603 B1 | * | 3/2002 | Zwern ........................ 345/158 |
| 6,388,640 B1 | * | 5/2002 | Chigira et al. .................. 345/8 |

FOREIGN PATENT DOCUMENTS

| CA | 2218812 | 10/1998 |
| JP | 10-289034 | 10/1998 |

* cited by examiner

Primary Examiner—Vijay Shankar
Assistant Examiner—Prabodh M. Dharia
(74) Attorney, Agent, or Firm—Fitzpatrick, Cella, Harper & Scinto

(57) ABSTRACT

A head mounted display apparatus includes two display units for the respective eyes of an observer, images being provided from the display units to the observer, and a head mount mechanism mounted on the observer's head in such a manner that the two display units are disposed in front of the observer. The head mount mechanism is capable of separating the display units from each other and connecting them together at a position corresponding to the front of the observer when he wears the two display units.

4 Claims, 14 Drawing Sheets

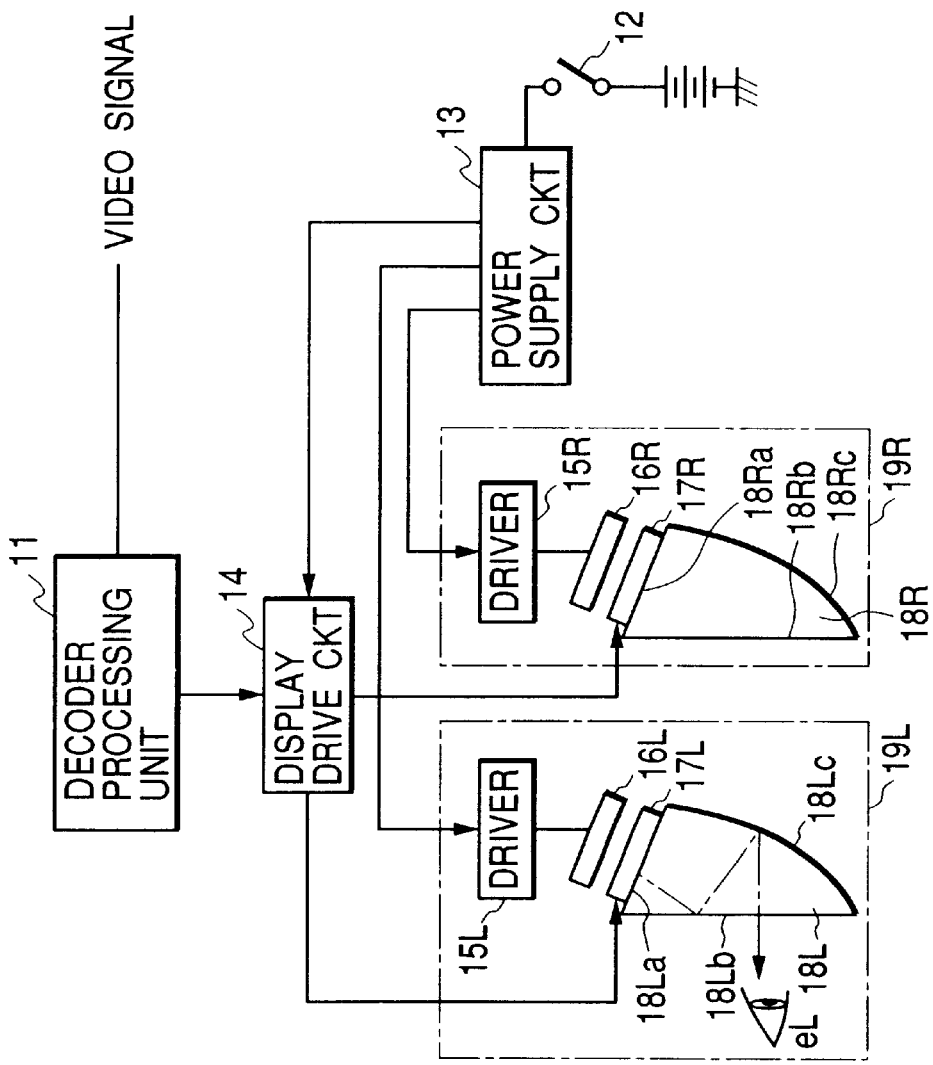

HEAD MOUNTED DISPLAY

BACKGROUND OF THE INVENTION

1. Field of the Invention

This invention relates to a head mounted display (HMD) mounted on an observer's head or face for displaying the character information of an image.

2. Related Background Art

In recent years, with the downsizing and lighter weight of pocketable telephones and personal digital assistant (PDA) or the like having electronic mail and scheduler functions, the concept of wearable computing such as mounting or always carrying these devices on one's clothes or body is taking root.

As a display device used in this wearable computing, attention has been paid to a head mounted display heretofore used as the display of package video or virtual reality (VR), and various computer systems utilizing the same have been proposed as shown in Japanese Patent Application Laid-Open No. 10-289034.

As head mounted displays utilized in the wearable computing, there are a display A of a type as shown in FIG. 1A of the accompanying drawings wherein the main body of a display unit is fixed through a belt, and a display B which, as shown in FIG. 1B of the accompanying drawings, is hung on the ears through bows 2 attached to the main body 1 of a display unit, and use is made of displays having various functions and in various forms conforming to places and situations. Also, the display B shown in FIG. 1B can be contained by the bows 2 provided on the sides of the main body 1 of the display unit being bent in the directions of the arrows through hinges 3.

FIG. 1C of the accompanying drawings shows the construction of a head mounted display according to the prior art using a compact and light-weight liquid crystal panel as a display element, and the output of a decoder processing unit 11 for inputting a video signal and the output of a power supply circuit 13 having a power supply switch 12 connected thereto are connected to a display drive circuit 14. Also, the outputs of the power supply circuit 13 are connected to illuminating back lights 16L and 16R through drivers 15L and 15R, respectively, and the outputs of the display drive circuit 14 are connected to display elements 17L and 17R for left and right eyes comprising liquid crystal panels which do not emit light by themselves. Optical elements 18L and 18R each comprising a prism are attached to these display elements 17L and 17R, respectively, and the optical elements 18L and 18R are formed with incidence surfaces 18L$a$, 18R$a$, reflecting surfaces 1BL$b$, 18R$b$ and half mirror surfaces 18L$c$, 18R$c$, respectively. Display optical systems 19L and 19R are formed by the left and right drivers 15L and 15R, back lights 16L and 16R, display elements 17L and 17R and optical elements 18L and 18R, respectively.

When the power supply switch 12 is closed, the power supply circuit 13 starts the supply of electric power necessary to the entire image display. An NTSC signal which is a video signal from a TV tuner or a video reproducer is inputted to the decoder processing unit 11 and converted into an RGB signal, whereafter it is outputted to the display drive circuit 14, and images are displayed on the display elements 17L and 17R. Also, the display elements 17L and 17R are not self-light emitting type elements and therefore are illuminated by the illuminating back lights 16L and 16R, respectively.

In the display optical systems 19L and 19R, beams emitted from the back lights 16L and 16R and passed through the display elements 17L and 17R are incident on the incidence surfaces 18L$a$ and 18R$a$ of the optical elements 18L and 18R, respectively, and are further incident on the reflecting surfaces 18L$b$ and 18R$b$ at an angle of incidence equal to or greater than a critical angle and are totally reflected. These totally reflected beams are reflected by the half mirror surfaces 18L$c$ and 18R$c$, and are again incident on the reflecting surfaces 18L$b$ and 18R$b$ at an angle of incidence smaller than the critical angle, and are images on an observer's pupils eL and eR (of which eR is not shown). As the result, the images displayed on the display elements 17L and 17R are enlargedly observed by the observer.

The above-described head mounted display according to the prior art, however, does not take it into consideration to carry the head mounted display to the outdoors in order to perform mobile computing or wearable computing, and is of a shape unsuitable for carrying. Accordingly, it is more preferable that the head mounted display be mounted on the head only when electric mail is to be read or when access is to be had to the internet, and can be dismounted from the head and contained and carried in a bag or the like when the access or the like is completed. Further, the head mounted display according to the prior art is not designed to be capable of more simply controlling an external apparatus.

SUMMARY OF THE INVENTION

It is a primary object of the present invention to provide a head mounted display which is easy to carry in its daily used state and is easy to mount and dismount.

It is another object of the present invention to provide a head mounted display which can be utilized for a long time with the amount of use of a battery curtailed and without the battery being recharged, and a control method of making it possible.

It is still another object of the present invention to provide a head mounted display which makes an external apparatus connected thereto more simply controllable, a control method and a control program for a video signal supplying apparatus which make it possible.

Other objects of the present invention will become apparent from the following description of some embodiments of the invention.

BRIEF DESCRIPTION OF THE DRAWINGS

FIG. 1C shows the construction of the head mounted display according to the prior art.

DESCRIPTION OF THE PREFERRED EMBODIMENTS

The present invention will hereinafter be described in detail with respect to some embodiments thereof shown in FIGS. 2A and 2B to 12.

Figure 1A:
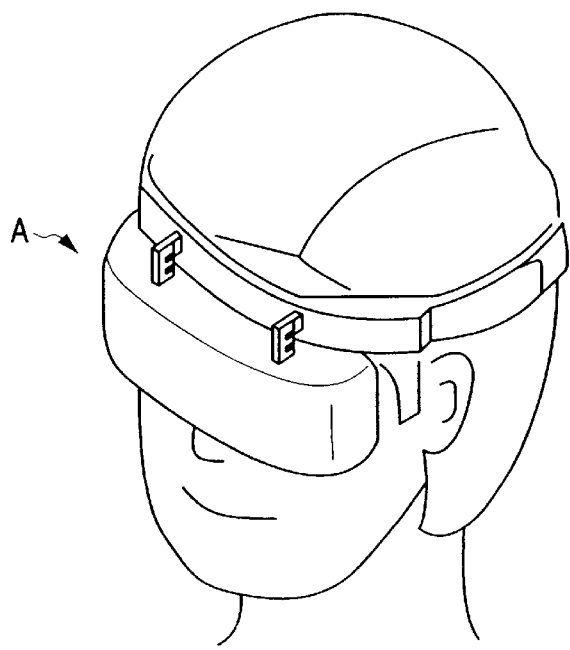
FIG. 1A is a schematic view of a head mounted display according to the prior art.
Figure 1B:
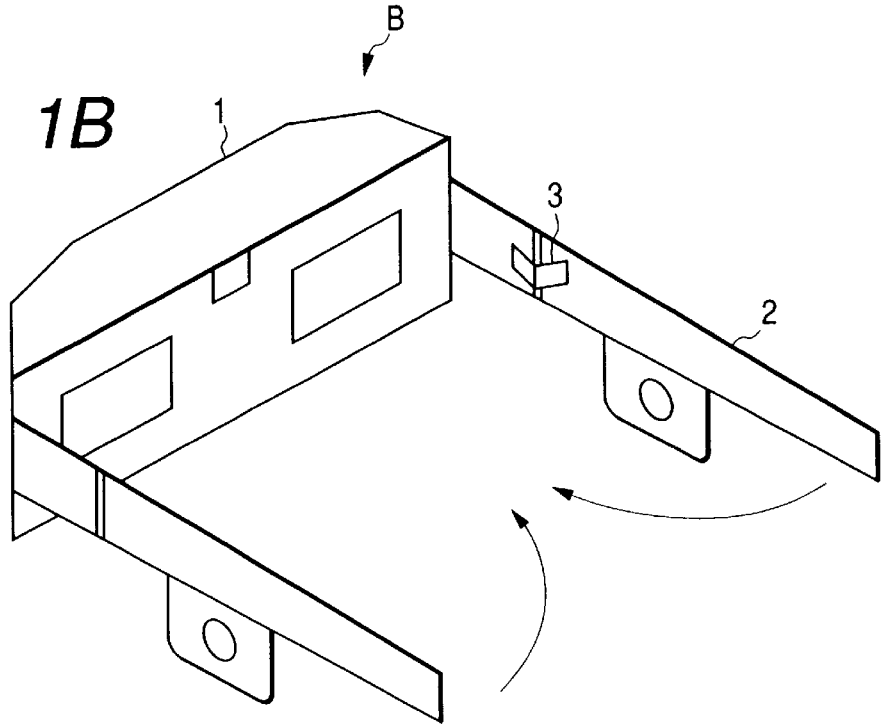
FIG. 1B is a schematic view of a head mounted display according to the prior art.
Figure 2A:
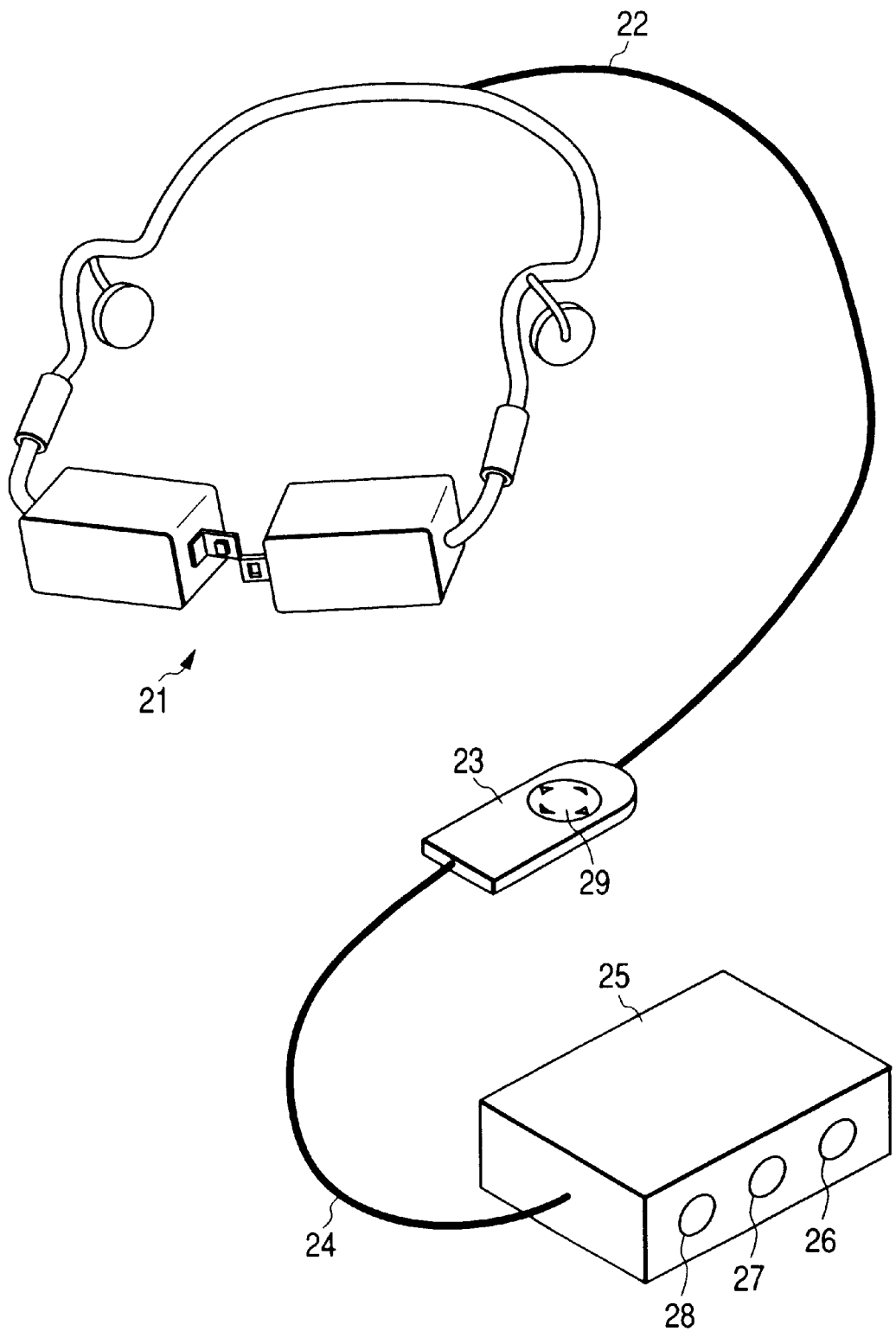
FIG. 2A is a perspective view of a head mounted display.

Referring to FIG. 2A which shows a perspective view of a head mounted video display according to a first embodiment, the main body 21 of a display unit is connected to a remote control unit 23 through a cable 22, and is further connected to a relay box 25 through a cable 24 so that a video signal, and audio signal, electric power, etc. may be transmitted. On the relay box 25, there are provided a power supply jack 26, a video input jack 27 for inputting a VGA video signal from a mobile computer, and an audio input jack 28 for inputting voices. Also, a chargeable battery, not shown, is contained in the relay box 25.

The power supply jack 26 is used to connect an AC adapter for the charging of the contained battery or the supply of external electric power. The video input jack 27 may be for the NTSC video signal of a TV tuner or a video reproducer or the like, or the video input jack 27 and the audio input jack 28 may be coupled to a single jack. Also, the remote control unit 23 is provided with a selection button 29 for communicating with the relay box 25.

Figure 2B:
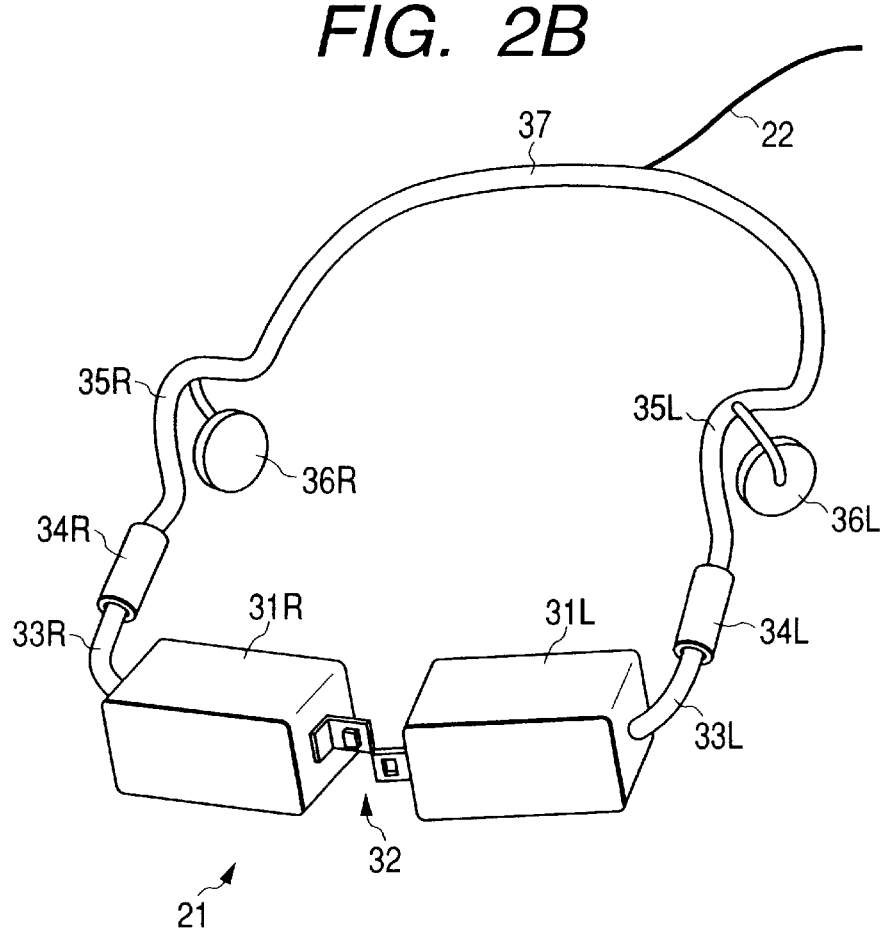
FIG. 2B shows the construction of the main body of a display unit

FIG. 2B shows the electrical construction of the main body 21 of the display unit. An image display unit 31L for the left eye and an image display unit 31R for the right eye are connected together through a pair of connecting members 32 during the use of the display. Frames 33L and 33R are attached to the sides of the image display units 31L and 31R, respectively. On the other ends of these frames 33L and 33R, there are provided adjusting portions 34L and 34R for adjusting the lengths of the frames 33L and 33R to prevent the falling of the head mounted display. Also, curved bow frames 35L and 35R are provided to the frames 33L and 33R, respectively, so as to be put on the ears like the bows of spectacles and mounted on the head. Earphones 36L ad 36R are attached to the bow frames 35L and 35R, respectively. An occipital frame 37 surrounds the back of the head and connects the opposite ends of the bow frames 35L and 35R together. The cable 22 for supplying electric power, a video signal and an audio signal is attached to the occipital frame 37, and is connected to the image display units 31L, 31R and the earphones 36L, 36R through the interiors of the occipital frame 37, the bow frames 35, the adjusting portions 34 and the frames 33.

Figure 3:
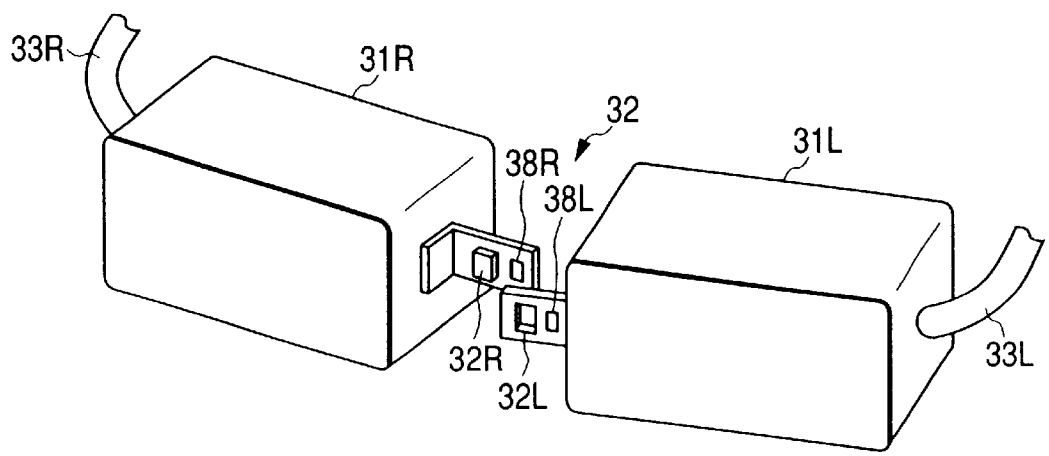
FIG. 3 is an enlarged view of a connecting member.

FIG. 3 shows an enlarged view of the connecting member 32. The connecting member 32 is comprised of a female type connecting member 32L provided on the display unit 31L for the left eye, and a male type connecting member 32R provided on the image display unit 31R for the right eye, and the respective connecting members 32L and 32R are provided with connection detecting units 38L and 38R, respectively, for detecting the connection by contact. As these connection detecting units, use can be made for example, of a pair of electrodes electrically energized by contact. When the head mounted display is to be mounted on the head, the female type connecting member 32L and the male type connecting member 32R are coupled together in the lower portion of the observer's brow to thereby make the mounting of the head mounted display onto the head firmer, and prevent the deviation of the display units 31L and 31R relative to the direction of the observer's eyes. Also, by the female type connecting member 32L and the male type connecting member 32R being connected together, it is detected that the connection detecting units 38L and 38R have contacted with each other and have been connected together.

Figure 4:
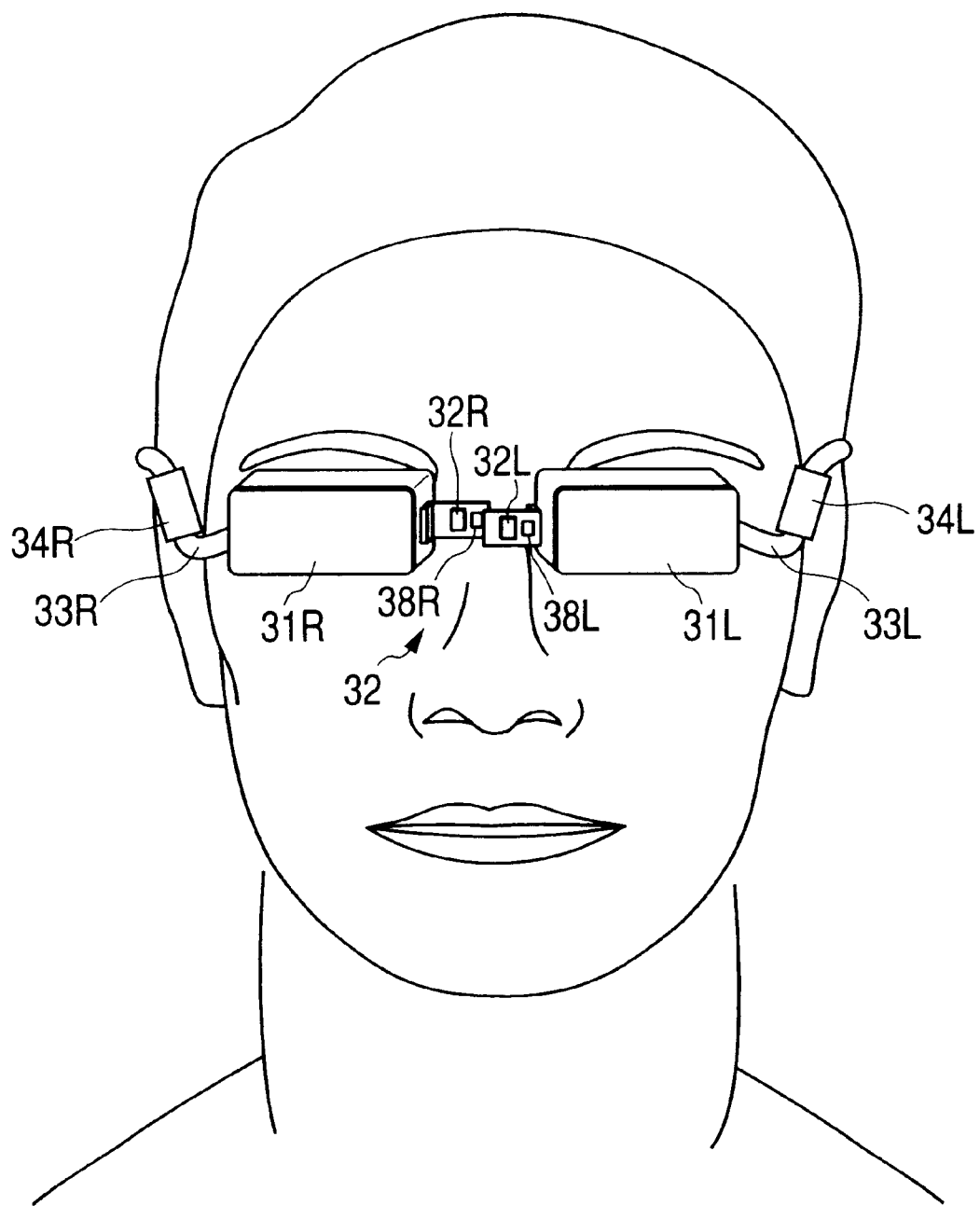
FIG. 4 is a front view of the head mounted display as it is mounted.
Figure 5:
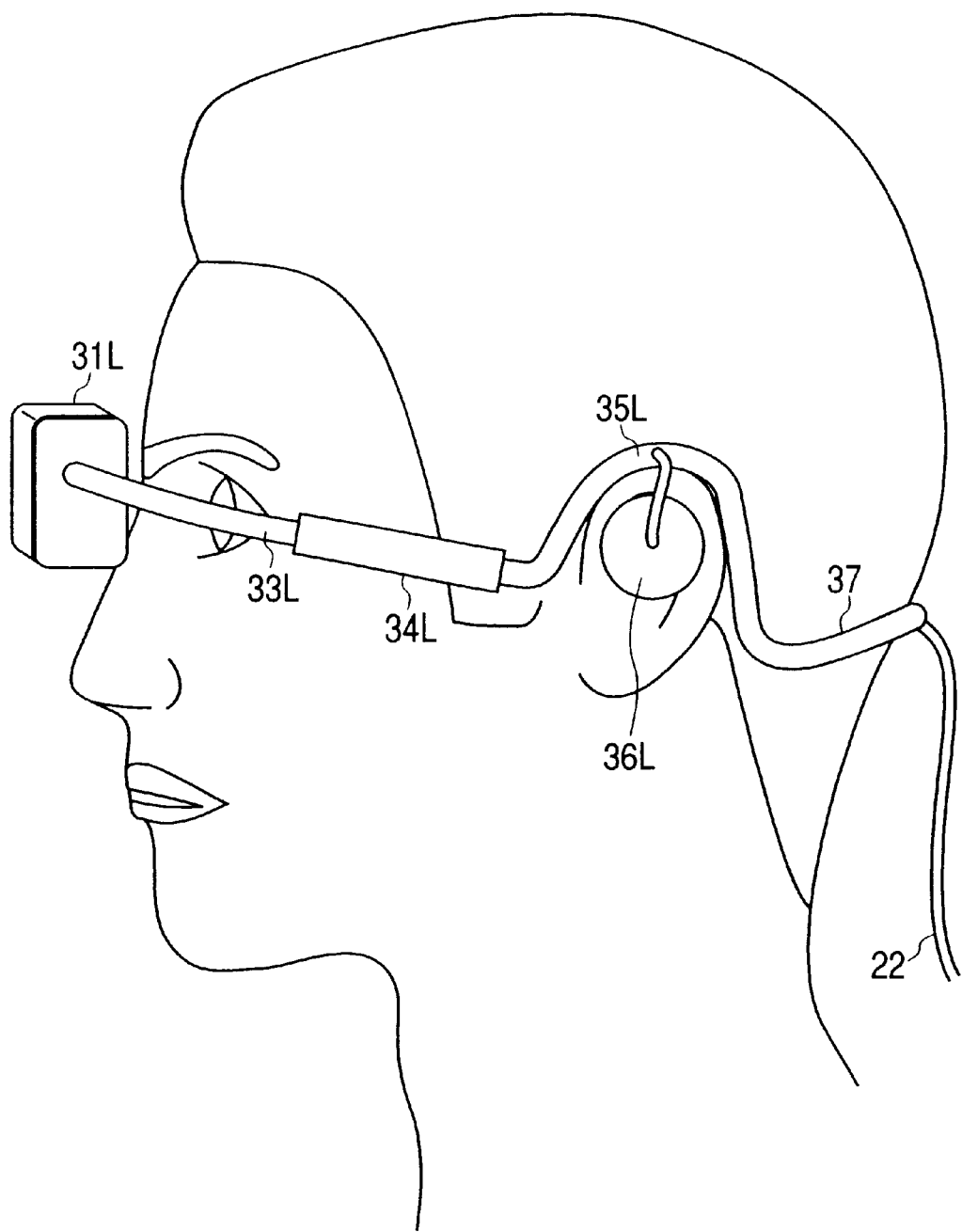
FIG. 5 is a side view of the head mounted display as it is mounted.

FIG. 4 shows a front view of the head mounted display as it is mounted, and FIG. 5 shows a side view thereof. While in FIG. 4, for the convenience of illustration, a state in which the connecting members 32 are separated from each other is depicted, it is to be understood that they are used while being connected together when the head mounted display is mounted. When the head mounted display is being mounted, the display portions 31L and 31R are fixed in the direction of the observer's eyes by the frames 33L and 33R, and further the display units 31L and 31R are connected together by the use of the connecting members 32, whereby the head mounted display is firmly mounted on the head. Thereby, the deviation of the display units 31L and 31R relative to the direction of the observer's eyes becomes small in such movements as the shaking of the head, standing up and squatting down in daily life. Also, when the connecting members 32 are connected together, the connection detecting units 38L and 38R come into contact with each other and the connection thereof is detected.

Figure 6:
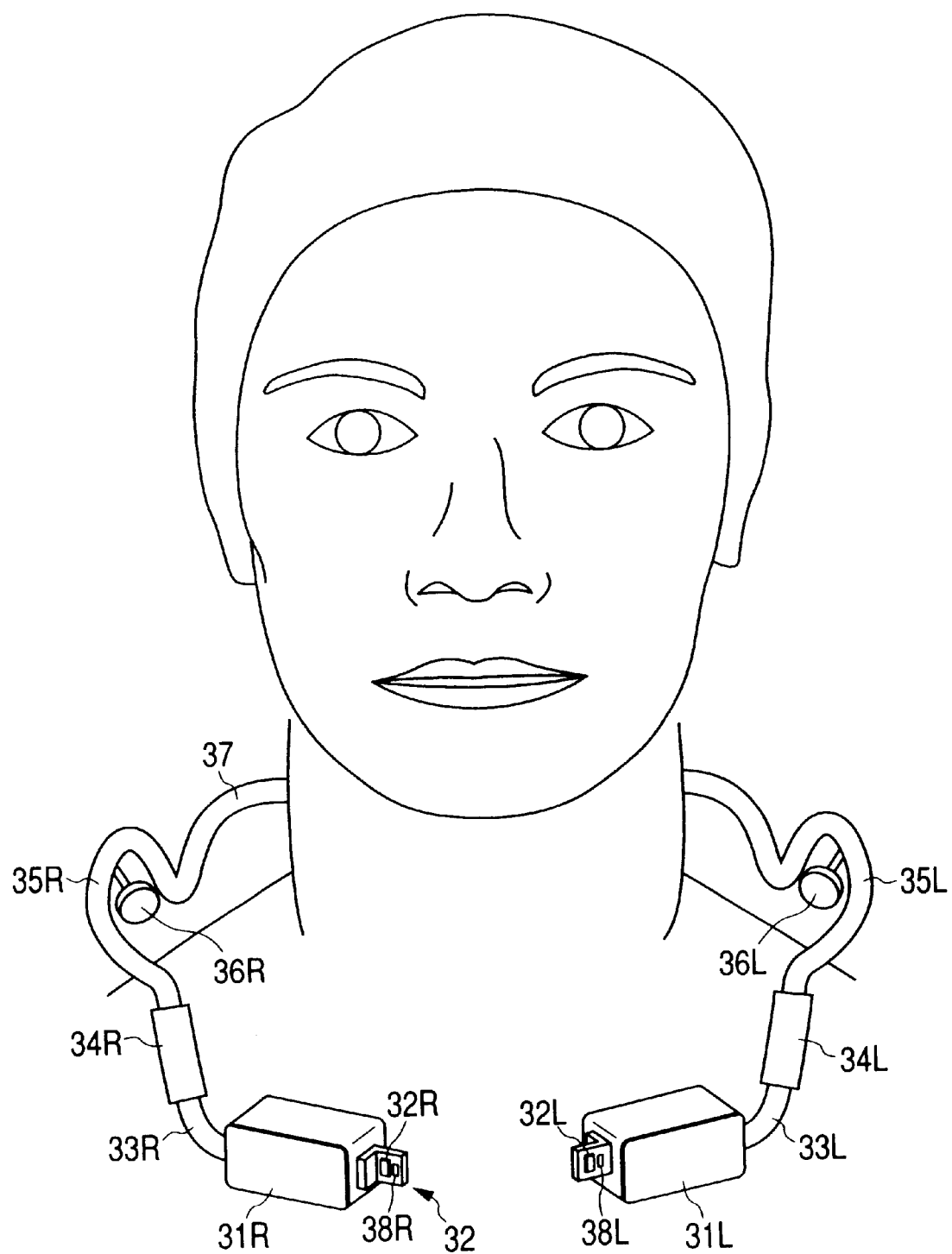
FIG. 6 is a front view of the head mounted display as it is dismounted.
Figure 7:
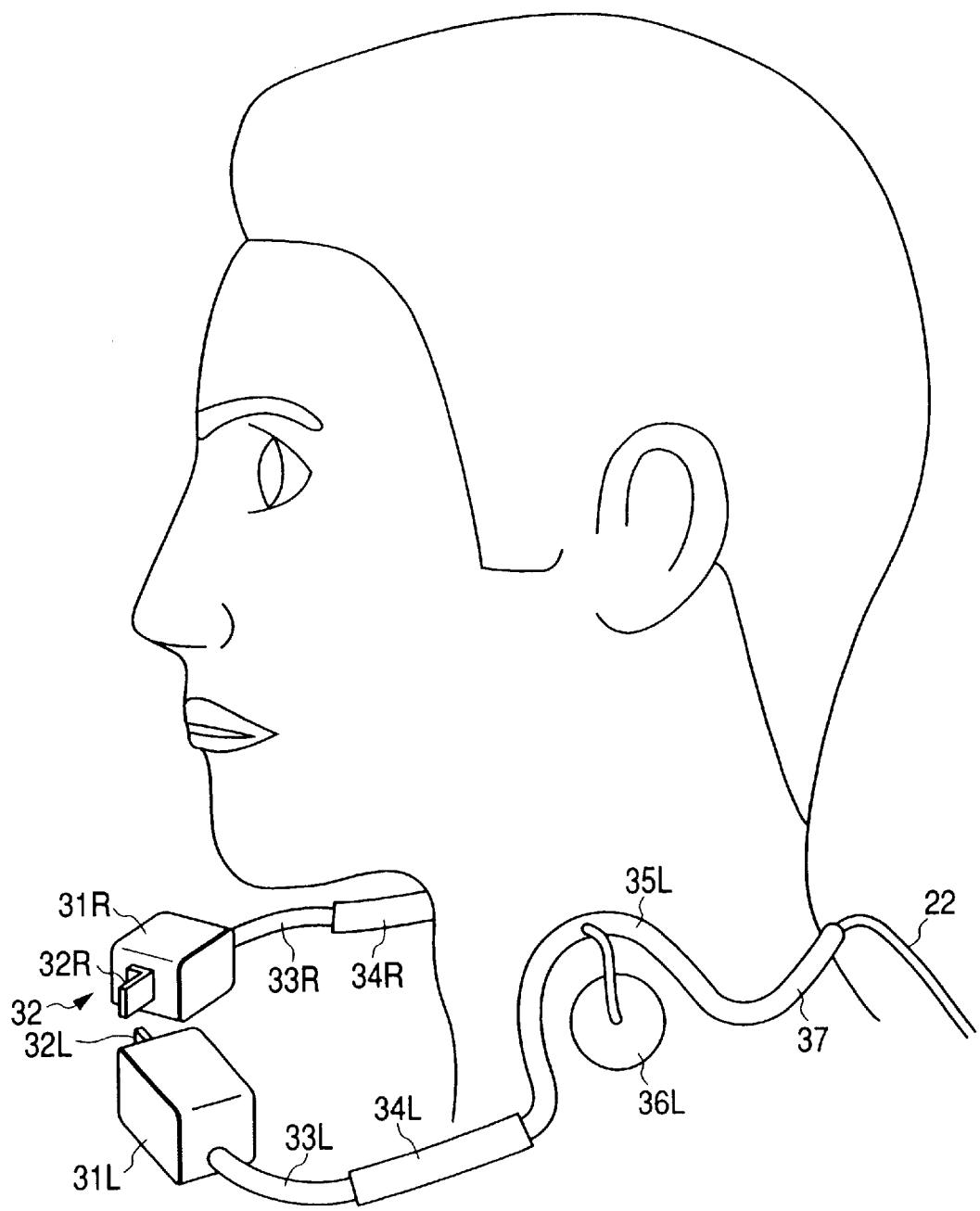
FIG. 7 is a side view of the head mounted display as it is dismounted.

FIG. 6 is a front view of the head mounted display as it is dismounted and is put on the neck and carried, and FIG. 7 is a side view thereof. When access to the internet or the like is completed and the utilization of the head mounted display is to be interrupted, the connecting members 32 are disconnected as shown in FIG. 7, whereby the connection detecting units 33R and 33L detect that the display units 31L and 31R have been separated from each other.

Figure 8:
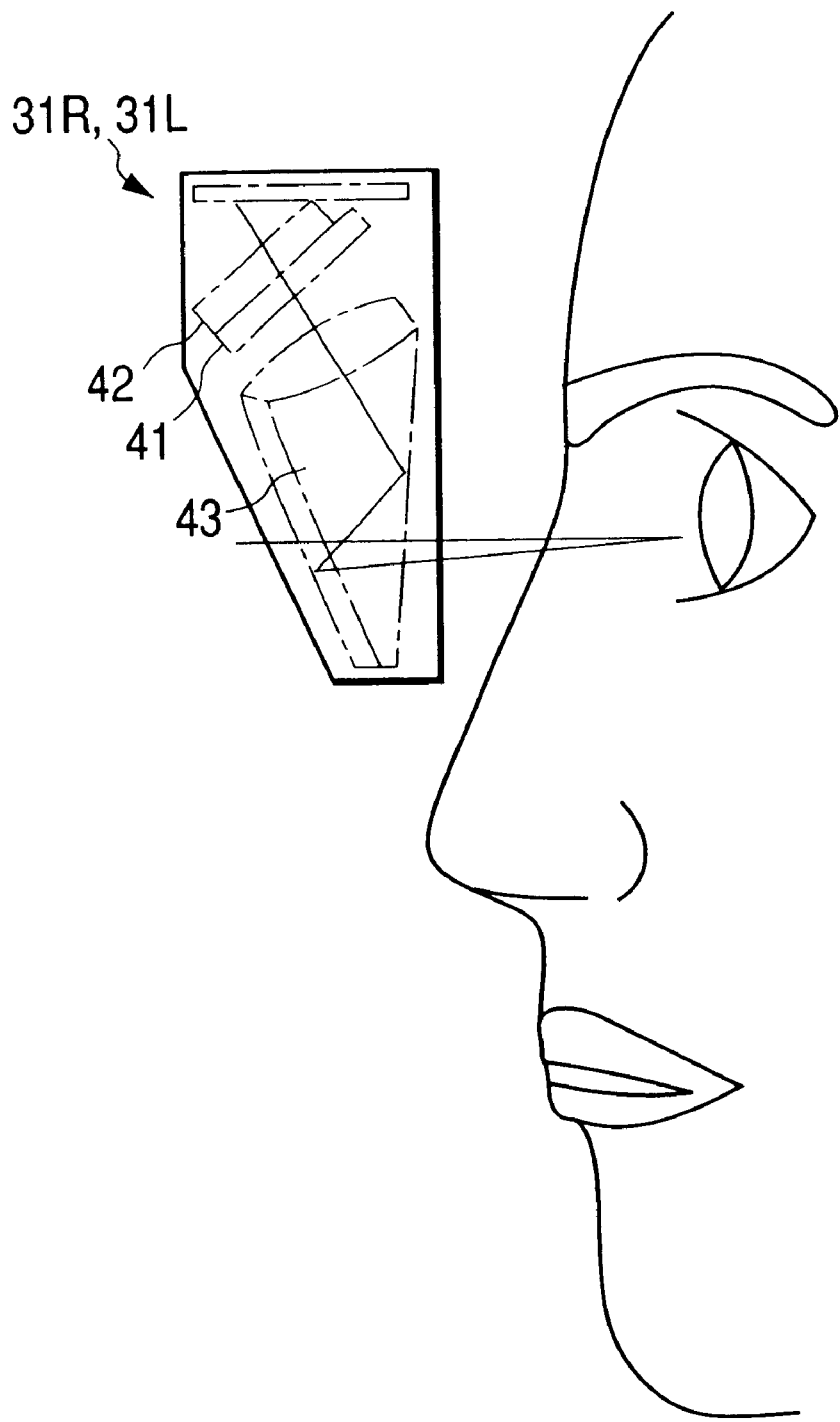
FIG. 8 is a cross-sectional view of an image display.

Also, as shown in FIG. 8, a liquid crystal display element 41 for displaying an image, a back light 42 and an optical element 43 are contained in each of the image display units 31L and 31R so that the image of the display element 41 may be illuminated by the back light 42 and may arrive at the eyeball through the optical element 43. Thereby, it becomes possible for the wearer to observe the aerial enlarged projection image in the air before his eyes.

Figure 9:
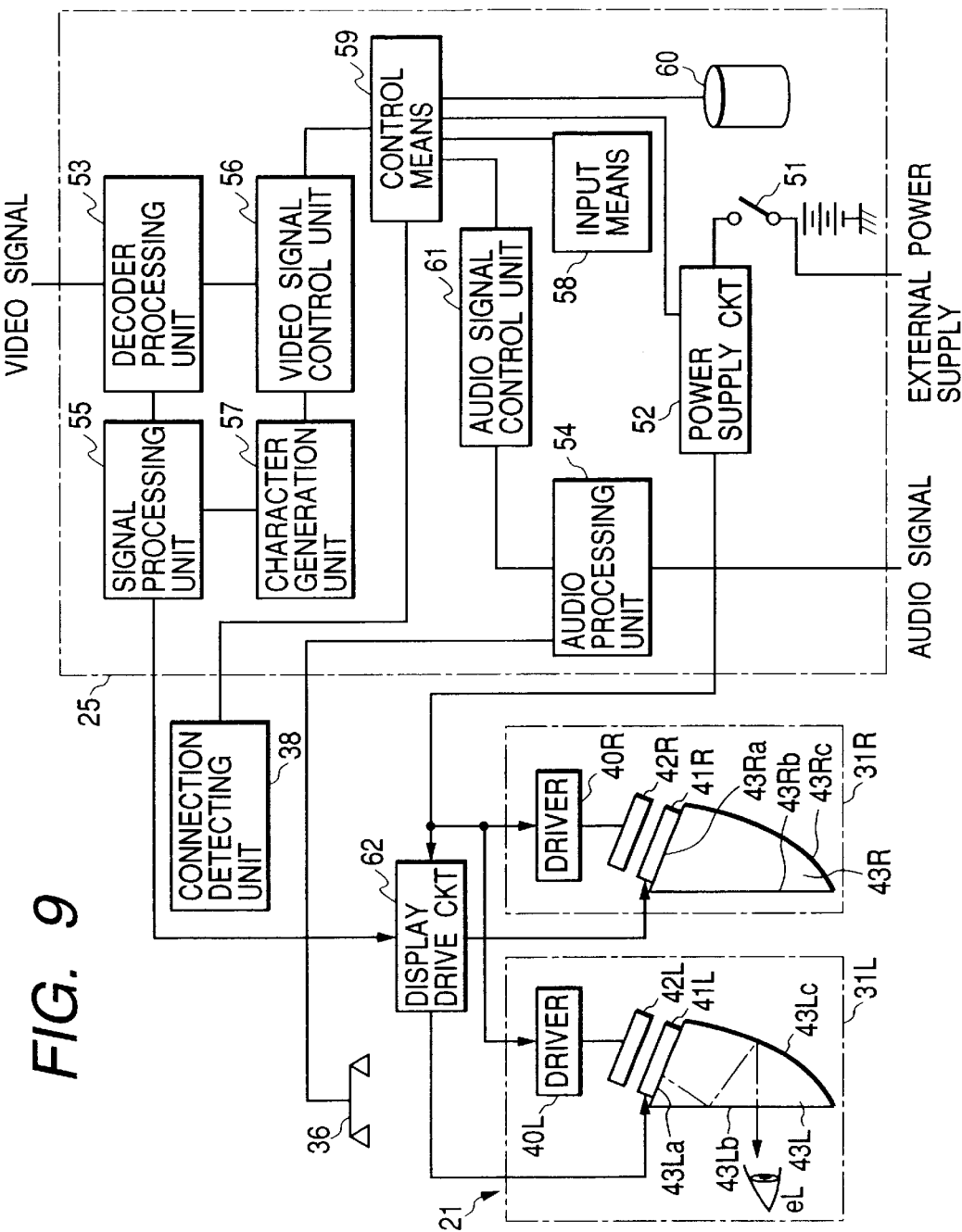
FIG. 9 shows the construction of a first embodiment of the present invention.

FIG. 9 shows the electrical construction of the main body 21 of the display unit and the relay box 25. In the image display optical systems 31L and 31R for the left and right eyes, the outputs of drivers 40L and 40R are connected to back lights 42L and 42R, respectively, for illuminating liquid crystal display elements 41L and 41R. Optical elements 43L and 43R each comprising a prism are attached to the liquid crystal display elements 41L and 41R, respectively. The optical elements 43L and 43R are formed with incidence surfaces 43L$a$, 43R$a$, reflecting surfaces 43L$b$, 43R$b$ and half mirror surfaces 43L$c$, 43R$c$, respectively. As regards the back lights, there are a case where the back light 42L for the left eye and the back light 42R for the right eye are separately disposed, and a case where a back light common for the left and right eyes is disposed.

In the relay box 25, there are disposed a power supply switch 51, a power supply circuit 52 having a battery, a decoder processing unit 53 to which a video signal is inputted, and an audio processing unit 54 to which an audio signal is inputted. The outputs of the decoder processing unit 53 are connected to a signal processing unit 55 and a video signal control unit 56. Also, the signal processing unit 55 is connected to the video signal control unit 56 through a character generation unit 57. The outputs of the video signal control unit 56 and input means 58 are connected to control means 59, which in turn is connected to memory means 60. The audio processing unit 54 is connected to the control means 59 through an audio signal control unit 61.

The control means 59 is a portion for controlling all of the video signal, the audio signal, the input and output signals, the power supply, etc. of this head mounted display, and has connected thereto the video signal control unit 56, the audio signal control unit 61, the power supply circuit 52 and the connection detecting unit 38 (corresponding to 38L and 38R).

The input means 58 is capable of setting various parameters by buttons, switches or the like, and is designed such that and for example, by the input jacks 26 and 27 disposed on the relay box 25, or the selection button 29 of the remote control unit 23 capable of communicating with the relay box 25, the observer can set brightness, tint, the depths of colors, sound volume, the balance of sound, the quality of sound, etc. in conformity with his liking.

The main body 21 of the display unit is comprised of the image display optical systems 31L and 31R for the left and right eyes, a display drive circuit 62, an earphone 36 (corresponding to 36L and 36R) and the connection detecting unit 38. The output of the signal processing unit 55 of the relay box 25 is connected to the display drive circuit 62, the output of the audio processing unit 54 is connected to the earphone 36, and the outputs of the power supply circuit 52 are connected to the display drive circuit 62 and the left and right drivers 40L and 40R.

In such a construction, when the power supply switch 51 of the relay box 25 is closed, the power supply circuit 52 starts the supply of electric power necessary for the whole of the image display. A VGA output from a mobile computer or the like or a video signal and an audio signal are inputted from a TV tuner or a video reproducer to the relay box 25, and the video signal is sent to the decoder processing unit 53 and the audio signal is sent to the audio processing unit 54. In the audio processing unit 54, the audio signal is subjected to processing in conformity with an audio parameter and is outputted to the earphone 36. The output from the earphone may be a monaural output or left and right stereo outputs.

The control means 59, when the signal from the connection detecting unit 38 is indicative of the jointed, i.e., mounted state, sends video parameters such as brightness, tint, the depths of colors, etc. to the video signal control unit 56. The video parameters are D/A-converted and sent to the decoder processing unit 53. In the decoder processing unit 53, an NTSC signal is converted into an RGB signal in conformity with these video parameters, and is sent to the signal processing unit 55. The character generation unit 57 delivers notice or warning for the observer and the image data of an adjusting screen such as brightness and colors to the signal processing unit 55 in accordance with instructions sent thereto from the video signal control unit 56. In the signal processing unit 55, the image data from the character generation unit 57 are mixed with the input video signal as required.

The RGB signal from the decoder processing unit 53 or the signal processing unit 55 is outputted from the relay box 25 and is transmitted to the display drive circuit 62 of the main body of the display unit through the cable 22, etc. Here, the left and right liquid crystal display elements 41L and 41R are illuminated by the back lights 42L and 42R, respectively. Beams emitted from the back lights 42L and 42R are distributed by light guiding plates and pass through the liquid crystal display elements 41L and 41R, and are incident on the incidence surfaces 43L$a$ and 43R$a$ of the optical elements 43L and 43R, respectively, and are incident on the reflecting surfaces 43L$b$ and 43R$b$ at an angle of incidence equal to or greater than a critical angle and are totally reflected. These totally reflected lights are reflected by the half mirror surfaces 43L$c$ and 43R$c$, and are incident on the reflecting surfaces 43L$b$ and 43R$b$ at an angle of incidence smaller than the critical angle, and are imaged on the user's pupils eL and eR (of which eR is not shown). As the result, images displayed on the liquid crystal display elements 41L and 41R are enlargedly observed by the user.

Figure 10:
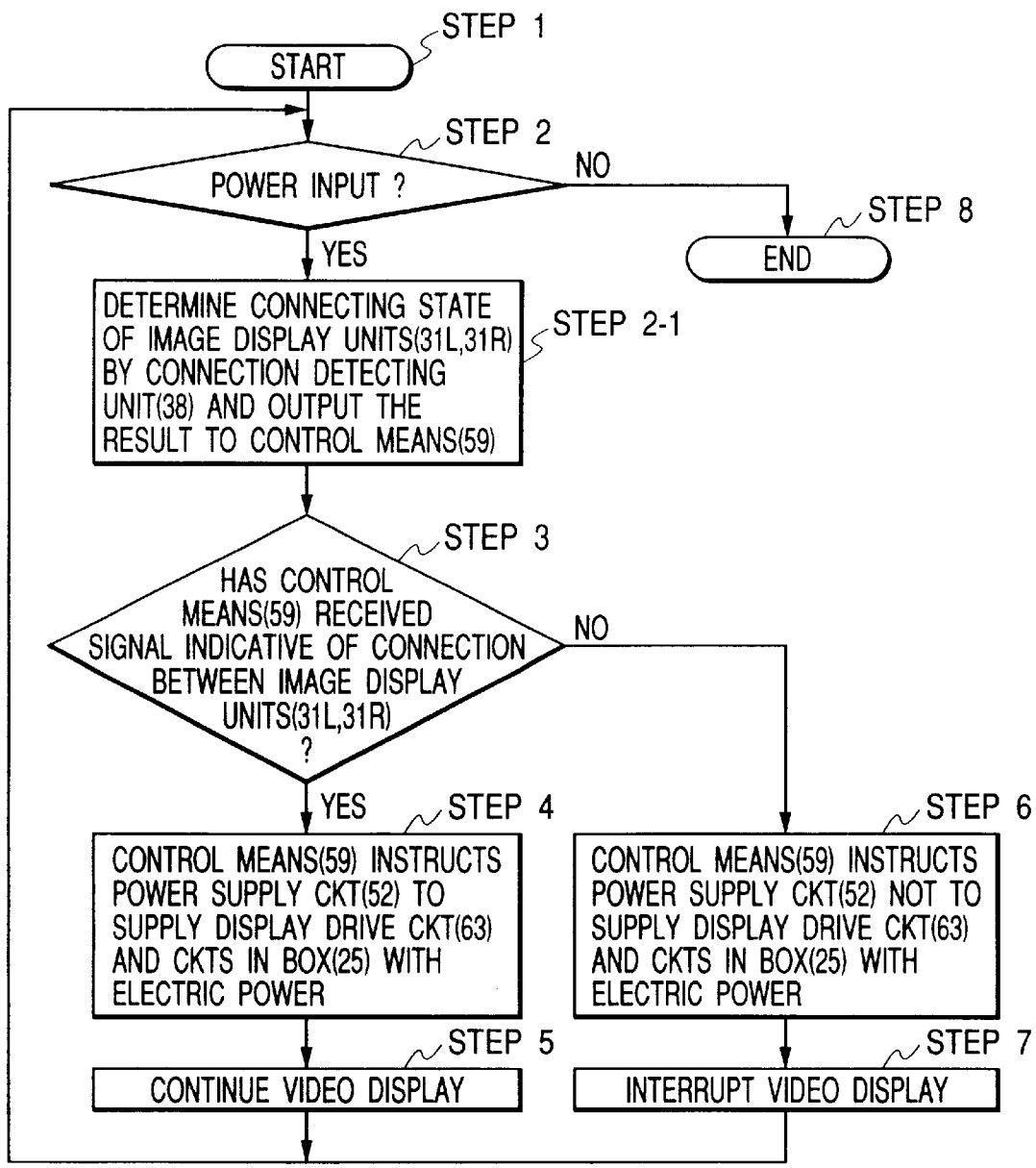
FIG. 10 is a flow chart in the first embodiment.

FIG. 10 shows a flow chart of the power supply control of the head mounted display. First, when start is made at a step 1, advance is made to a step 2. When the power supply is inputted by the power supply switch 51, at a step 2-1, the connection detecting unit 38 determines the connected state of the image display unit 31L and the image display unit 31R, and outputs the result to the control means 59. If at a step 3, the signal from the connection detecting unit 38 is a signal indicative of the connection, the control means 59 advances to a step 4, where the control means instructs the power supply circuit 52 to supply the display drive circuit 62 and the circuits in the relay box 25 with electric power. In accordance therewith, the power supply circuit 52 supplies electric power, and at a step 5, video display is continuously effected.

Also, if at the step 3, the signal from the connection detecting unit 38 is a signal indicative of the separation between the image display units 31L and 31R, advance is made to a step 6, where the control means 59 instructs the power supply circuit 52 to interrupt the supply of electric power to the display circuit 62 and the other circuits in the relay box than the control means 59, and at a step 7, the power supply circuit 52 interrupts the supply of electric power in accordance therewith. Thereby, video display is interrupted thereafter.

As long as the power supply is inputted by the power supply switch 51, the control means 59 continues to be supplied with electric power and always effects the control of the power supply in conformity with the state of the connection detecting unit 38. When the power supply is cut off by the power supply switch 51, advance is made to a step 8, where the control means 59 is neither supplied with electric power and thus, the program ends.

As described above, the supply of electric power can be controlled in conformity with the output of the connection detecting unit 38 and therefore, in response to the user wearing the display, the power supply can be automatically inputted when the user wears the display, and the power supply can be cut off when the user does not wear the display.

Figure 11:
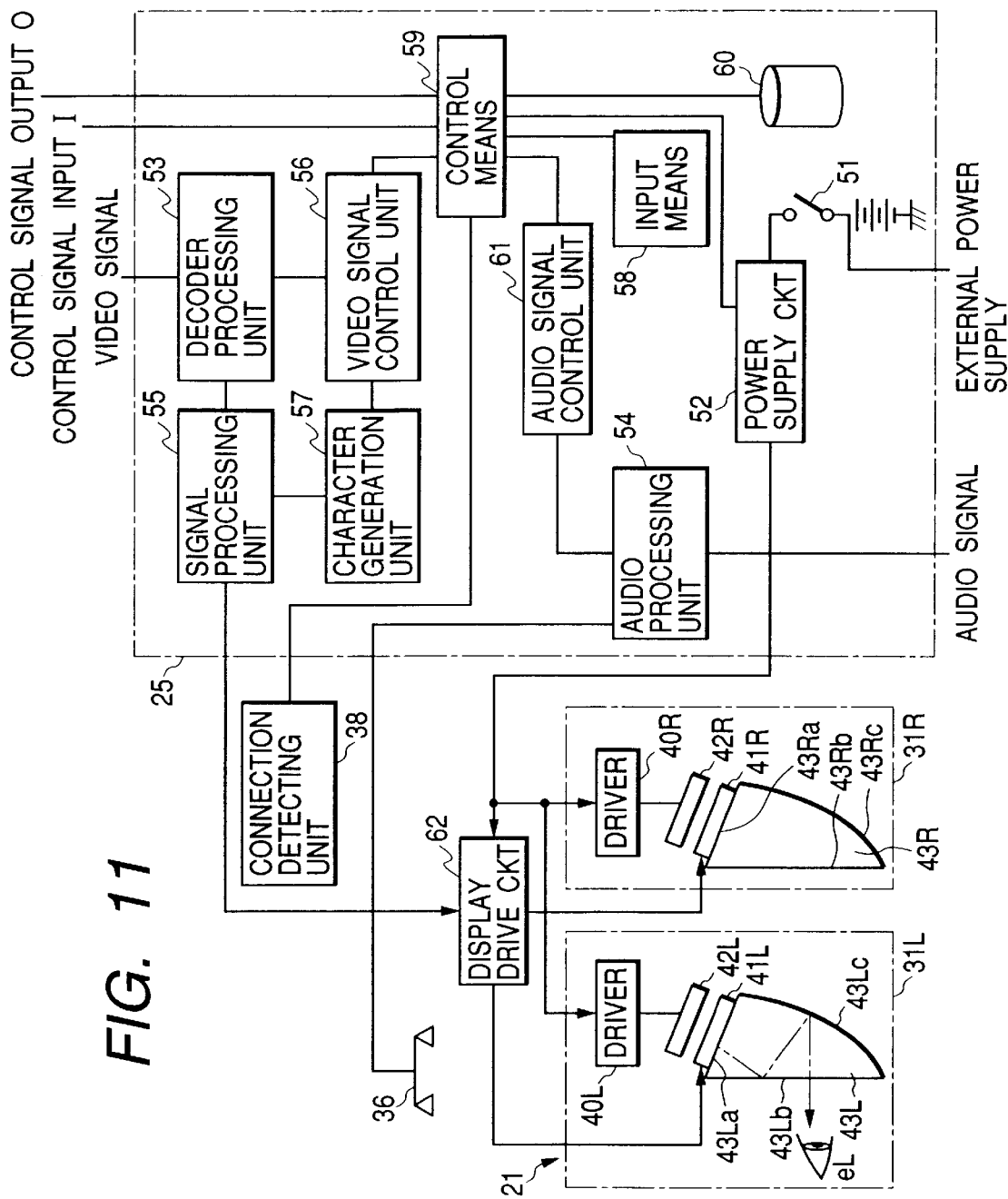
FIG. 11 shows the construction of a second embodiment of the present invention.

FIG. 11 shows the electrical construction of a head mounted display according to a second embodiment of the present invention. A control signal input I for inputting a power supply control signal from the outside and a control signal output O for outputting the power supply control state to the outside are applied to the control means 59 of the head mounted display according to the first embodiment through an external terminal, and in the other points, the construction of the second embodiment is similar to that of the first embodiment, and members functionally similar to those in the first embodiment are designated by similar reference numerals.

The control signal input I is a signal for controlling the power supply state of the head mounted display from an external apparatus. This is utilized to cut off the power supply of the head mounted display when the power supply or screen output of a computer or the like connected to the head mounted display and supplying a video signal is OFF. A monitor power saving signal such as DPMI which is in VESA standard may be utilized as the control signal input I in the present embodiment.

The control signal output O is a signal for informing the external apparatus of the power supply state of the head mounted display. This is utilized to control the power supply of an apparatus such as a computer connected to the head mounted display or to control the outputting of the video signal when the power supply of the head mounted display is cut off.

Figure 12:
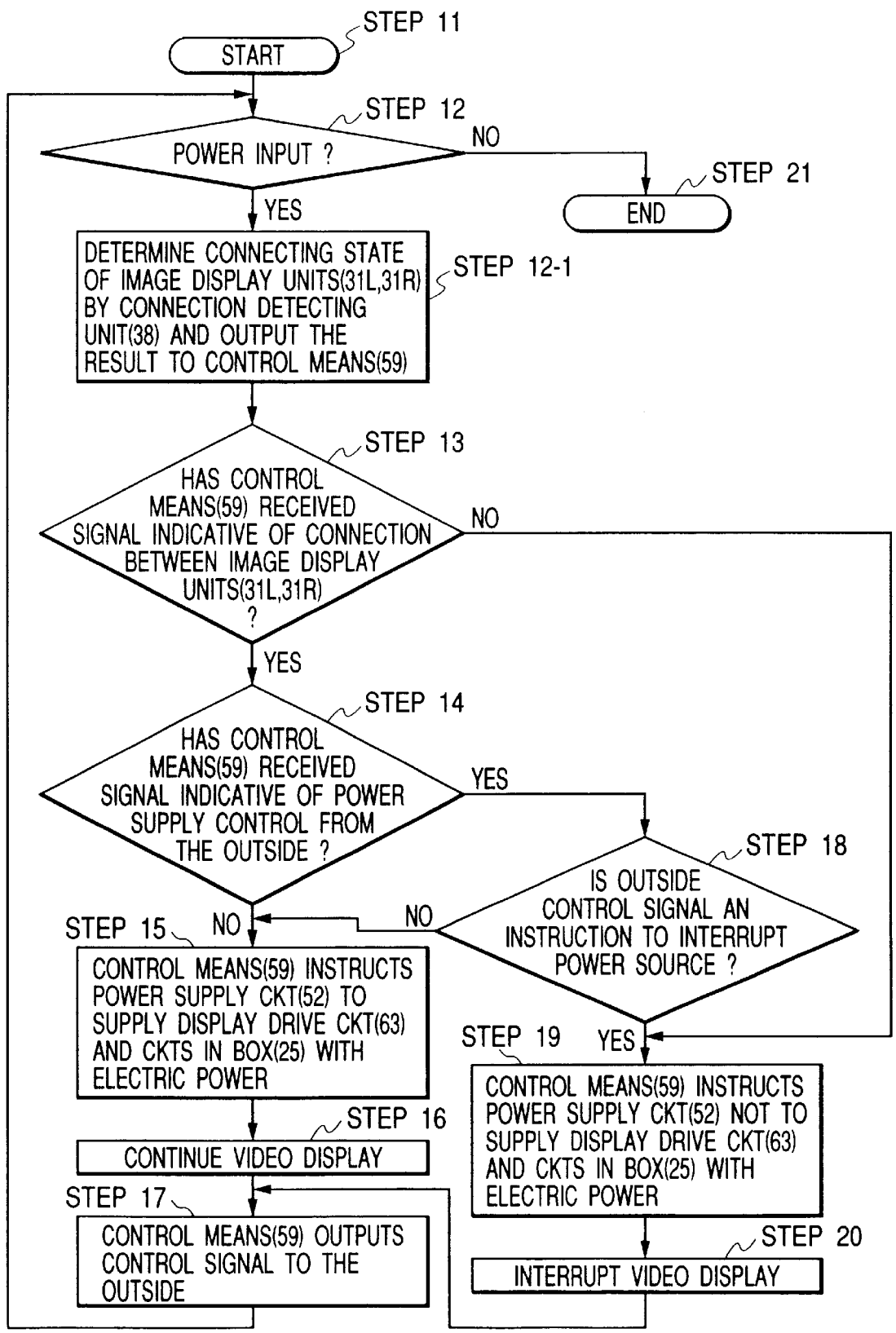
FIG. 12 is a flow chart in the second embodiment.

FIG. 12 shows a flow chart of the power supply control of the head mounted display according to the present embodiment. First, when start is made at a step 11, advance is made to a step 12. When the electric power is inputted by the power supply switch 51, at a step 12-1, the connection detecting unit 38 determines the connected state of the image display unit 31L and the image display unit 31R, and outputs the result to the control means 59. At a step 13, whether this output signal is indicative of connection or disconnection is determined, and if the output signal is a signal indicative of connection, advance is made to a step 14. At the step 14, whether the control signal input I is a signal indicative of the power supply control is determined. If the control signal input I is not a signal indicative of the power supply control, at a step 15, the control means 59 instructs the power supply circuit 52 to supply the display drive circuit 62 and the circuits in the relay box 25 with electric power, and in accordance therewith, at a step 16, the power supply circuit 52 supplies electric power, and video display is continuously effected. Subsequently, at a step 17, the control means 59 outputs the current power supply control situation to the control signal output.

Also, if at the step 14, the control signal input I is a signal indicative of the power supply control, advance is made to a step 18, where whether it is indicative of the power supply input or indicative of the power supply cut-off is determined, and if it is indicative of the power supply input, the processing of the step 15 and subsequent steps is carried out. If it is indicative of the power supply cut-off, as when at the step 13, the signal indicative of the separation between the image display unit 31L and the image display unit 31R has arrived from the connection detecting unit 38, advance is made to a step 19, where the control means 59 instructs the power supply circuit 52 to interrupt the supply of electric power to the display drive circuit 62 and the other circuits in the relay box 25 than the control means 59, and in accordance therewith, at a step 20, the power supply circuit 52 interrupts the power supply. Subsequently, advance is made to the step 17, where the current power supply control situation is outputted to the control signal output.

As long as the power supply is inputted by the power supply switch 51, the control means 59 continues to be supplied with electric power and always effects the control of the power supply in conformity with the state of the connection detecting unit 38 and the control signal input. However, when at the step 12, the power supply is cut off by the power supply switch 51, advance is made to a step 21, where the control means 59 is neither supplied with electric power, and the program ends.

As described above, in the second embodiment, the power supply can be controlled in conformity with the output of the connection detecting unit 38 and the control signal input I and therefore, an apparatus such as a computer which outputs a video signal to the head mounted display can control the power supply of the head mounted display corresponding to its own operative state.

Also, since the control signal output O is put out from the head mounted display, the apparatus such as the computer which outputs a video signal to the head mounted display can be informed of the power supply state of the head mounted display. For example, it becomes possible to prevent the waste of the power supply that in spite of the power supply of the head mounted display being cut off, the video signal continues to be outputted or the computer apparatus is operated, and mitigate the general power consumption during mobile computing.

Figure 13:
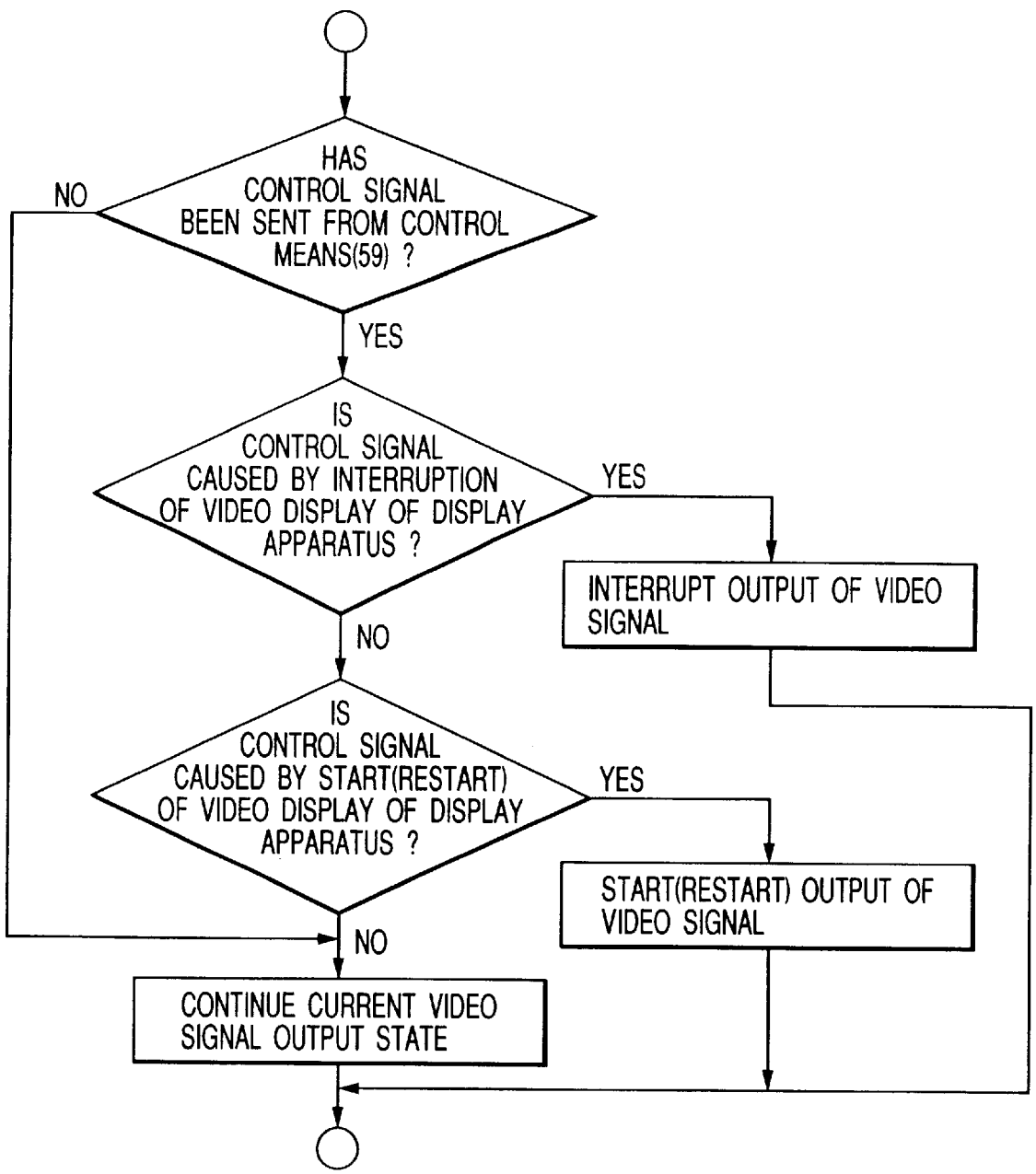
FIG. 13 is a partial flow chart on a computer side.

In that case, it will suffice for the computer side to include the flow as shown in FIG. 13 in OS or the program of application software. Specifically, if there is a control signal from the display side, it is discriminated and the video signal output is started/interrupted. This may be substituted for by the ON/OFF of the apparatus power supply.

Also, when the power supply of the head mounted display has been cut off, it is possible to cut off the power supply of the apparatus such as the computer which outputs a video signal to the head mounted display in operative association therewith.

The above-described head mounted display is provided with the display unit for the left eye and the display unit for the right eye, and these display units can be connected together and separated from each other at a position in front of the observer and therefore, when the heat mount display is not used, it becomes possible to hang the mounting member on the neck.

In mobile computing and wearable computing, such utilization is possible that documents in the computer are perused in a train, and when the train is to be changed, the head mounted display is detached from the head, and after the user gets on the next train, he wears the display again on his head and returns to the perusal of documents. In such utilization, the mounting and dismounting of the head mounted display are easy and the user can carry it not by containing it in a bag or the like but by hanging it on his neck and therefore, the convenience to the reader can be improved.

Also, design is made such that the supply of electric power to the video display units is restrained while the display unit for the left eye and the display unit for the right eye are separated from each other and hung on the neck, whereby it becomes possible to decrease the consumption of electric power, and for example, mitigate the exhaustion of the battery and lengthen the utilization time outdoors.

Further, by providing a control signal input for effecting the power supply control from the outside, and a control signal output for informing the outside of the power supply state, it becomes possible to effect the general video signal output control, the power supply control, etc. of a computer or a video apparatus utilizing the head mounted display, and it becomes possible to lengthen the utilization time of the entire system outdoors.

Besides this, according to the above-described head mounted display and the control method therefore, electric power can be supplied/interrupted to a predetermined electric circuit in conformity with a change in the mounted state of the display, and the consumption of electric power can be reduced.

Besides this, according to the control method and control program for the above-described head mounted display and video signal supply apparats, the control of an external apparatus, particularly a video signal supply apparatus can be effected by a change in the mounted state of the head mounted display and therefore, more convenient and appropriate apparatus control becomes possible.

What is claimed is:

1. A head mounted display comprising:

a head mount mechanism having an annular structure to enable the head mounted display to be mounted on a head of an observer; and two display units provided on said head mount mechanism and driven by electric power to provide left and right eyes of the observer with images supplied from an external image supply device, wherein said head mount mechanism includes connection means between said two display units and in front of the observer, and said head mount mechanism is configured to be annular in shape by attaching said connection means so as to enable the head mounted display to be mounted on the head of the observer, and said connection means is detached to break the annular configuration so as to enable the head mounted display to be removed from the head of the observer.

2. A head mounted display according to claim 1, further comprising optical systems for guiding the images displayed on said display units for left and right eyes toward the respective eyes of the observer.

3. A head mounted display according to claim 1, further comprising:

a detecting mechanism for detecting an attaching state of said connection means; and a power supply control unit for controlling supply of electric power to said display units, wherein when said detecting mechanism detects that said connection means is attached, said power supply control unit supplies said display units with electric power, and when said detecting mechanism detects that said connection means is detached, said power supply control unit cuts off electric power to said display units.

4. A head mounted display according to claim 1, further comprising:

a detecting mechanism for detecting an attaching state of said connection means; and an output unit for outputting an electric signal indicative of the attached state of said connection means detected by said detecting mechanism.

* * * * *

UNITED STATES PATENT AND TRADEMARK OFFICE
CERTIFICATE OF CORRECTION

PATENT NO.    : 6,727,865 B1
DATED         : April 27, 2004
INVENTOR(S)   : Hiroki Yonezawa It is certified that error appears in the above-identified patent and that said Letters Patent is hereby corrected as shown below:

Column 1,
Line 51, "1BLb," should read -- 18Lb, --.

Column 3,
Line 47, "ad" should read -- and --.

Column 9,
Line 1, "apparats" should read -- apparatus --.

Signed and Sealed this

Twenty-second Day of March, 2005

JON W. DUDAS
*Director of the United States Patent and Trademark Office*